May 14, 1935.  A. COHEN  2,001,599
BRAKING APPARATUS
Filed Nov. 23, 1932  2 Sheets-Sheet 1

Inventor
Abraham Cohen

May 14, 1935. A. COHEN 2,001,599
BRAKING APPARATUS
Filed Nov. 23, 1932 2 Sheets—Sheet 2

Inventor
Abraham Cohen

Patented May 14, 1935

2,001,599

UNITED STATES PATENT OFFICE 2,001,599

BRAKING APPARATUS

Abraham Cohen, New Haven, Conn.

Application November 23, 1932, Serial No. 644,108

20 Claims. (Cl. 188—71)

This invention relates to fluid pressure operated brakes and more particularly to fluid pressure operated brakes for motor vehicles.

An object of the invention is to provide a brake that is simple in construction and very unlikely to get out of order.

A further object of the invention is to provide a brake that is compact in form and effective.

A further object of the invention is to provide an effective brake made up of a minimum number of parts.

A further object of the invention is to provide a brake associated with a vehicle wheel whereby the parts of the brake are readily demountable and accessible for repair, inspection, and the like.

A further object of the invention is to provide a brake made up of standard parts so that a new part may be easily interchanged for a worn part.

With these and other objects in view, the invention resides in the novel features of construction and combination and arrangements of parts as more fully hereinafter described and claimed.

In the accompanying drawings I have shown one embodiment of the invention.

Figure 1:
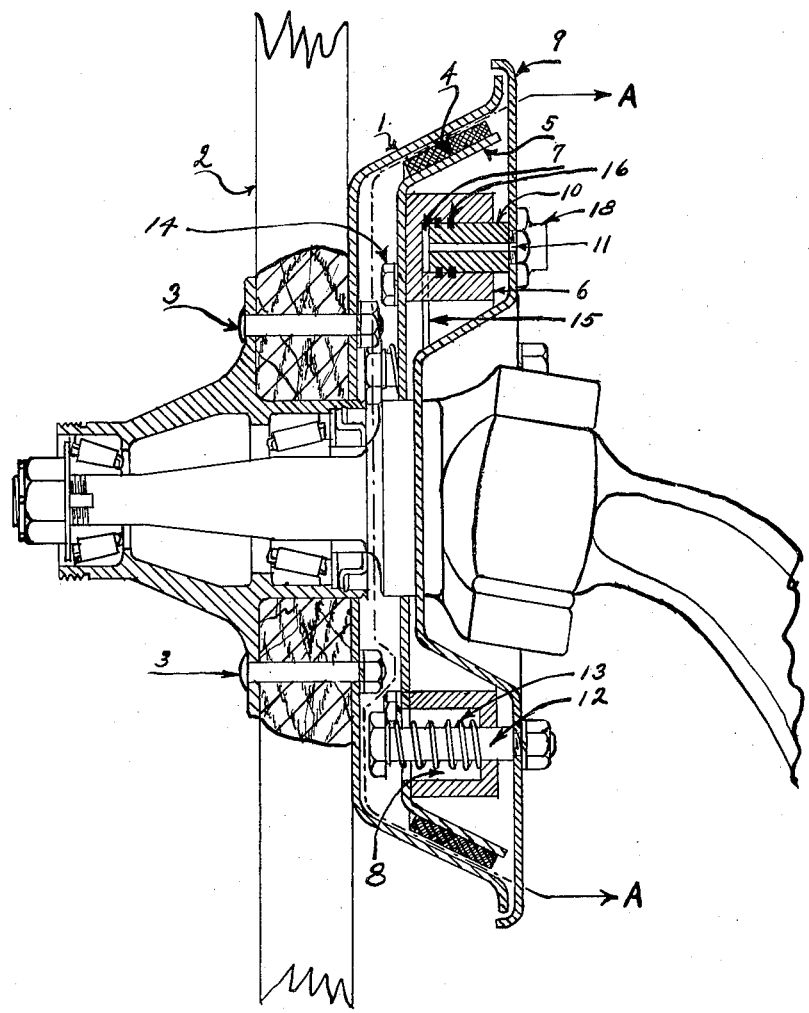
Figure 1 is a sectional view of a front wheel of a vehicle showing the construction of the braking apparatus.
Figure 2:
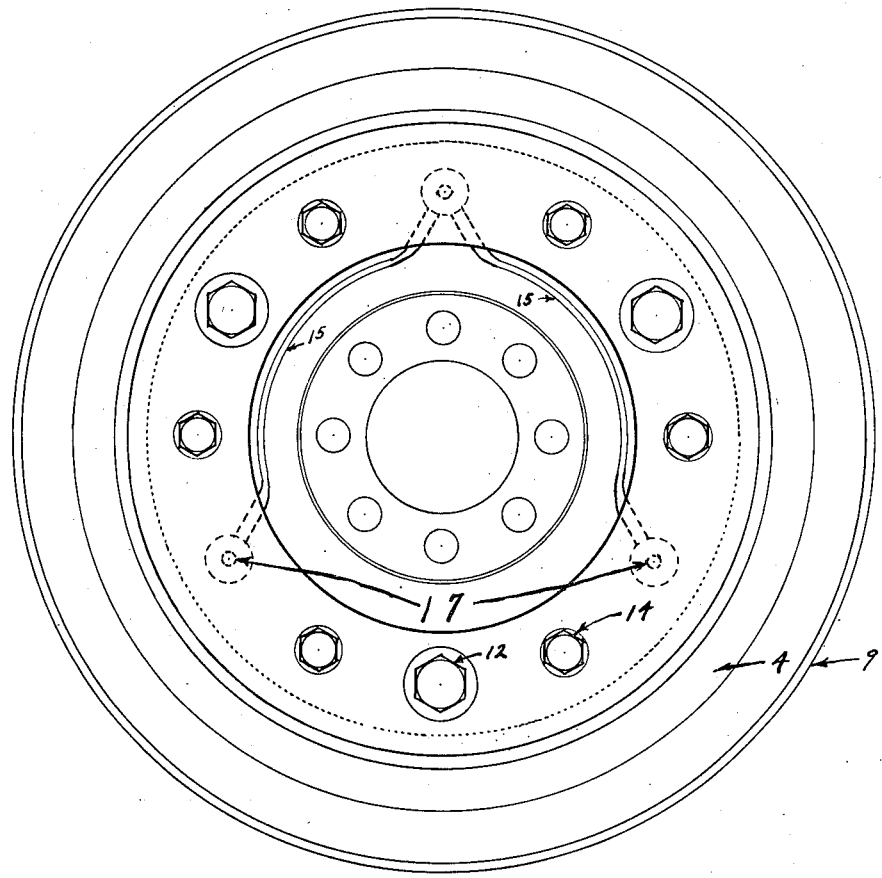
Figure 2 is a view on line A—A of Figure 1 looking in the direction of the arrows.
Figure 3:
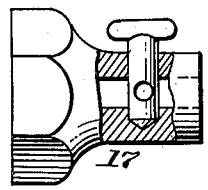
Fig. 3 is a view partly in section and partly in elevation of one of the purge valves 17.

Referring to the drawings, reference numeral 1 designates the brake drum which is secured to the wheel 2 of a vehicle by the bolts 3. The brake lining 4 is fastened to the brake shoe 5 by rivets, not shown. The cast iron ring 6 is attached to the brake shoe 5 by screws 14. Three equally spaced cylindrical cavities 7 are formed in one side of the cast iron ring 6. Three equally spaced cavities 8 are also formed in the opposite side of the cast iron ring 6. The stationary pistons 10, which are bored at 11, are secured to the base 9 and engage the side walls of the cavity 7 so that the cast iron ring 6 may slide thereon. Attached to the base 9 is the bolt 12 which slidably engages the end wall of the cavity 8 in the cast iron ring 6. The spring 13 confined between the head of the bolt 12 and the end wall of the cavity 8 is under compression and tends to move the brake shoe 5 away from the drum 1 when fluid pressure acting on the cast iron ring 6 ceases. The pipes 15 connect the three cavities 7. Rings 16 encircle the pistons 10 which slidably engage the side walls of cavities 7. Bleeder valves 17 are connected to the bore of the two lower pistons 10 so that air may be purged from the fluid pressure system at these points. To purge the system it is only necessary to turn the conventional pet-cock-type valve 17 to open position until all the foreign matter is forced out. The valve should then be turned to closed position in order that the brake may again be normally operated. The inlet fitting 18 is the sole fluid pressure inlet to the brake proper.

The brake drum 1, the brake shoe 5 and the base 9 are preferably made of pressed steel and the ring 6 of cast iron.

The operation of the brake will be apparent from the foregoing description. The brake shoe 5 is normally retained in spaced position from brake drum 1 by springs 13. The pressure of the spring forces the casting 6 and the brake shoe 5, which is attached thereto, toward the base 9 and keeps the brake lining 4 out of engagement with the brake drum 1. The brake drum revolves with the wheel, the brake shoe is nonrotatable and is only slidable in a horizontal direction. The base 9 is stationary, being supported and fixed to the axle. When it is desired that the brake be operated, oil, air, or other fluid under pressure is admitted to the inlet fitting 18 from whence it passes through bore 11 into a cavity 7, then through pipes 15 into the other two cavities 7 causing pressure to be applied to the three end walls of the cavities 7. This forces the shoe toward the drums against the pressure of the springs 13 and the brake lining 4 will engage the drum 1 and thus retard the revolution of the wheel or effect a braking action.

It will be noted that in order to replace a worn brake lining, it is only necessary to remove the wheel, which is preferably of the readily removable type, to remove screws 14, remove the shoe 5 and to replace it with a new shoe on which is a new brake lining, then to replace the screws 14 and the vehicle wheel.

It is to be understood that the form of the invention herewith shown and described is to be taken as a preferred example of the same, and that various changes in the shape, size, and arrangement of parts may be resorted to without departing from the spirit of the invention or the scope of the subjoined claims.

Having thus described my invention, what I claim is:

1. In a fluid pressure operated brake, a brake drum, a base member, a brake shoe slidably supported by said base member, a plurality of cylinders secured to and movable with said brake shoe, a stationary piston in each cylinder, means for supplying fluid pressure to one of said cylinders, pipes for connecting said cylinders, said pipes being connected to that end of each cylinder which is remote from said base and near to said brake shoe.

2. In a fluid pressure operated brake, a brake drum, a base member, a brake shoe slidably supported by said base member, a plurality of cylinders, a piston in each cylinder, means for supplying fluid pressure to said pistons, pipes for connecting said cylinders, said pipes being connected to that end of each cylinder which is remote from said base and near to said brake shoe.

3. In a fluid pressure brake, a brake drum, a base, a brake shoe, a member fastened to said brake shoe and slidably supported by said base, means for applying fluid pressure to said member, said brake shoe being readily removable from said member.

4. In a fluid pressure brake, a brake drum, a base, a brake shoe, a member fastened to said brake shoe and slidably supported by said base, a plurality of cylinders formed in said member, a stationary piston in each cylinder and attached to said base, means for applying fluid pressure to said cylinders, said brake shoe being readily removable from said member.

5. In a fluid pressure brake, a brake drum, a base, a brake shoe, a member fastened to said brake shoe and slidably supported by said base, a plurality of cylinders formed in said member, a stationary piston in each cylinder and attached to said base, means for applying fluid pressure to one of said cylinders, means for connecting said cylinder to the remaining cylinders.

6. In a fluid pressure brake, a brake drum, a base, a brake shoe, a member fastened to said brake shoe and slidably supported by said base, a plurality of cylinders associated with said member, a piston for each cylinder, means for applying fluid pressure to said cylinders, said brake shoe being readily removable from said member.

7. In a fluid pressure brake, a brake drum, a base, a brake shoe, a member fastened to said brake shoe and slidably supported by said base, a plurality of cylinders associated with said member, a piston for each cylinder, means for supplying fluid pressure to said pistons, pipes connecting said cylinders, said pipes being connected to that end of each cylinder which is remote from said base and near to said brake shoe, said brake shoe being readily removable from said member.

8. In a brake, a pressed steel brake drum, a pressed steel base, a pressed steel shoe, a cast iron member fastened to said shoe, means associated with said member responsive to a motive force for causing said shoe to engage said drum.

9. In a fluid pressure brake, a brake adapted to be secured to a revolving member, a base member adapted to be secured to the axle around which said revolving member revolves, a brake shoe, a ring member fastened to said brake shoe and slidably supported by said base, a plurality of cylinders formed in said ring member, a stationary piston for each cylinder, said cylinders being fastened to said base, means for supplying fluid pressure to said pistons, pipes connecting said cylinders, said pipes being connected to that end of each cylinder which is remote from said base and near to said brake shoe, said brake shoe being readily removable from said ring member.

10. In a braking mechanism, a brake drum, a frustro-conical brake shoe positioned within said brake drum, said shoe having a ring member attached thereto, a plurality of cylinders formed in said ring member, a base positioned adjacent said shoe, a plurality of center-bored pistons positioned on said base adapted to cooperate with said cylinders, spring means associated with said braking mechanism adapted to normally retain said shoe out of contact with said drum and a manifold connecting each of said cylinders.

11. In a braking mechanism, a brake drum, a frustro-conical brake shoe positioned within said brake drum, said shoe having a ring member attached thereto, a plurality of cylinders formed in said ring member, a base positioned adjacent said shoe, a plurality of pistons, one of which is center-bored, positioned on said base and adapted to cooperate with said cylinders, spring means associated with said braking mechanism adapted to normally retain said shoe out of contact with said drum and a manifold connecting each of said cylinders.

12. In a braking mechanism, a brake drum, a brake shoe adapted to cooperate with said brake drum, said shoe having a ring member attached thereto, a plurality of cylinders formed in said ring member, a base positioned adjacent said shoe, a plurality of bored pistons positioned on said base adapted to cooperate with said cylinders, spring means associated with said braking mechanism adapted to normally retain said shoe out of contact with said drum, and a manifold connecting each of said cylinders.

13. In a braking mechanism, a brake drum, a frustro-conical brake shoe adapted to cooperate with said brake drum, said shoe having a ring member attached thereto, a plurality of cylinders formed in said ring member, a base positioned adjacent said shoe, a plurality of pistons, some of which are bored, positioned on said base and adapted to cooperate with said cylinders, spring means associated with said braking mechanism adapted to normally retain said shoe out of contact with said drum, a manifold connecting each of said cylinders, means for supplying fluid under pressure to the bore of one of said pistons, and valve means connected to the bore of another of said pistons for purging the fluid pressure system when desired.

14. In a braking apparatus, a brake drum, a base member, a brake shoe slidably supported by said base member, means for applying fluid pressure to said brake shoe, said last named means including a plurality of interconnected cylinders and a bored stationary piston in each cylinder, and valve means attached to the bore of one of said pistons for purging when desired.

15. In a brake, a brake drum, a brake shoe, means for forcing said brake shoe against said brake drum when braking is desired and for normally retaining said brake shoe out of contact with said brake drum, said means including a flat ring member bored on opposite sides.

16. In a brake, a brake drum, a brake shoe, means for forcing said brake shoe against said brake drum when braking is desired and for normally retaining said brake shoe out of contact with said brake drum, said means including a flat ring member bored on opposite sides, the bores on one side being adapted to receive pistons, the bores on the other side being associated with springs.

17. In a fluid pressure brake, a brake drum, a base member, a brake shoe slidably supported by said base member, means for applying fluid pressure to said brake shoe, said means including a plurality of cylinders, connections for said cylinders and a piston in each cylinder, said connections being situated entirely between the said base member and the said shoe.

18. In a fluid pressure brake, a brake drum, a base, a brake shoe, a member fastened to said brake shoe and slidably supported by said base, said member including a movable cylinder and said base having associated therewith a stationary piston for cooperating with said cylinder, means for applying fluid to said member, said brake shoe being readily removable from said member.

19. In a brake, a pressed steel brake drum, a pressed steel base, a pressed steel shoe, a cast iron member fastened to said shoe, a cylinder associated with said member movably responsive to a motive force for causing said shoe to engage said drum.

20. In a fluid pressure brake, a brake drum, a base, a brake shoe, a member fastened to said brake shoe and slidably supported by said base, said member and said base having associated therewith a piston and cylinder one of which is movable, means for applying fluid pressure to said member, said brake shoe being readily removable from said member.

ABRAHAM COHEN.